United States Patent Office 3,051,724
Patented Aug. 28, 1962

3,051,724
NOVEL BIS(TRIMELLIT-IMIDE) ALKANES AND BIS(TRIMELLIT-AMIDE) ALKANES
Benjamin A. Bolton, Gary, Ind., and Kenneth E. Kolb, Corning, N.Y., assignors to Standard Oil Company, Chicago, Ill., a corporation of Indiana
No Drawing. Filed Feb. 3, 1961, Ser. No. 86,848
5 Claims. (Cl. 260—325)

This invention relates to bis(trimellit-imide)alkanes and bis(trimellit-amide)alkanes.

A new bisimide has been discovered which has the structural configuration:

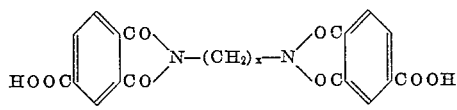

where $x$ is an integer from 2 to 12.

These bisimides have been designated as bis(trimellit-imide)alkanes.

The bisimides of the invention are preparable from trimellitic anhydride and alkylene diamines having from 2 to 12 carbon atoms, such as, ethylene diamine, diaminobutane, hexamethylenediamine, and diaminooctane. Trimellitic anhydride and the diamine are reacted in 2:1 molar proportion. The reaction may be carried out in the presence of a suitable solvent or in the absence of a solvent. Solvents having high solvent power for trimellitic anhydride are preferred, i.e., acetone and dimethylformamide. The bisamide product is converted to the bisimide by heating to the temperature at which imide formation takes place; for example, about 150° C.

Illustration I (a) 19.2 g. (0.1 mole) of trimellitic anhydride was dissolved in 200 cc. of cp. acetone.

(b) 6 g. (0.1 mole) of ethylene diamine was dissolved in 20 cc. of acetone and this solution added to (a) with stirring. More acetone was added to reduce the viscosity and the mixture allowed to stir for several hours. Then, 30 g. (0.156 mole) of trimellitic anhydride in acetone solution was added and the mixture allowed to stir overnight.

The bisamide product, a white crystalline material, was obtained in a yield of 90% by filtration. The bisamide was characterized as follows: melting point, above 300° C.; acid No., 477; and percent nitrogen, 5.7. The theoretical for bis(trimellit-amide)ethane is: acid No., 483; and percent nitrogen, 6.3.

The bisamide was refluxed in 500 ml. of xylene for about 24 hours. 3.5 ml. of water was removed. The product had an acid No. of 272.5. The theoretical acid No. for the bisimide is 274. Melting point was over 300° C.

Illustration II

Trimellitic anhydride was dissolved in acetone to form a 0.5 molar solution. A one molar solution of 1,6-hexane diamine in dimethyl formamide was prepared. The diamine solution was added drop-wise to the trimellitic anhydride solution with agitation. The final solution of diamine and trimellitic anhydride was permitted to stand overnight; a precipitate formed. This precipitate was separated by filtration. The solid material had an acid number of 445 and a melting point in excess of 300° C. The theoretical acid number of bis(trimellit-amide)hexane is 445.

The bisamide was converted to bisimide in situ by heating with trimethylol ethane at 204° C.–260° C. 0.02 mole of bisimide and 0.023 of trimethylol ethane were reacted at 260° C. to form a clear homogeneous liquid in about one-half hour of heating time. At this point 5.4 g. (.02 M) of tall oil fatty acids was added and the reaction mixture cooled to 232° C. After about three hours at 232° C. the product had an acid number of 25.9. Several minutes later it appeared to be gelling. It was dissolved in a mixture of xylene/n-butanol 60/40. It was necessary to add some dimethyl formamide and acetone to dissolve the partially gelled product. This solution had a solids content of 31.8% and Gardner viscosity of L.

.003″ wet films were applied to tin panels and baked for 30 minutes at 149° C. The baked film was exceptionally clear and colorless. It was very hard and mar-resistant. The tin panel could be bent sharply without the coating cracking or crazing. It has an impact resistance of greater than 80 in.-lbs. on the Gardner Impact Tester. When exposed to 2% caustic solution for 4 hours only slight dulling occurred. The coated panel was immersed in boiling water for one-half hour. No softening or dulling of the coating occurred. This resin is useful as a can coating or as a general purpose fast curing coating.

This is a continuation-in-part of our co-pending application Serial No. 20,563 filed April 7, 1960, which is now abandoned.

Thus, having described the invention, what is claimed is:

1. A bisimide having the formula:

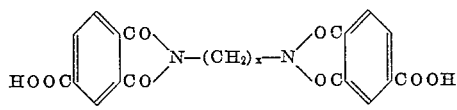

where $x$ is an integer from 2 to 12.

2. The bisimide of claim 1 wherein $x$ is 2.
3. The bisimide of claim 1 wherein $x$ is 6.
4. Bis(trimellit-imide)alkane of 2 to 12 carbon atoms in said alkane.
5. Bis(trimellit-amide)alkane of 2 to 12 carbon atoms in said alkane.

References Cited in the file of this patent

Ohi: Chem. Abstracts, vol. 44, p. 5867 (1950).
Billman et al.: J. Am. Chem. Soc., vol. 76, pages 1944–1945 (1954).